(12) United States Patent
Yadav et al.

(10) Patent No.: US 12,658,507 B2
(45) Date of Patent: Jun. 16, 2026

(54) PRISMATIC INVERTED-U BATTERY STACK GEOMETRY

(71) Applicant: GM GLOBAL TECHNOLOGY OPERATIONS LLC, Detroit, MI (US)

(72) Inventors: Anil Yadav, Troy, MI (US); Srikant Srinivasan, Novi, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 545 days.

(21) Appl. No.: 18/340,267

(22) Filed: Jun. 23, 2023

(65) Prior Publication Data

US 2024/0429495 A1 Dec. 26, 2024

(51) Int. Cl.
| | |
|---|---|
| *H01M 50/103* | (2021.01) |
| *H01M 4/131* | (2010.01) |
| *H01M 4/133* | (2010.01) |
| *H01M 4/134* | (2010.01) |
| *H01M 4/66* | (2006.01) |
| *H01M 10/0525* | (2010.01) |

(Continued)

(52) U.S. Cl.
CPC ......... *H01M 50/103* (2021.01); *H01M 4/131* (2013.01); *H01M 4/133* (2013.01); *H01M 4/134* (2013.01); *H01M 4/661* (2013.01); *H01M 10/0525* (2013.01); *H01M 10/613* (2015.04); *H01M 10/625* (2015.04); *H01M 10/647* (2015.04); *H01M 10/6554* (2015.04); *H01M 2220/20* (2013.01)

(58) Field of Classification Search
CPC ........... H01M 10/0525; H01M 10/613; H01M 10/625; H01M 10/647; H01M 10/6554; H01M 2220/20; H01M 4/131; H01M 4/133; H01M 4/134; H01M 4/661; H01M 50/103; H01M 50/209; H01M 50/211; H01M 50/249; Y02E 60/10
See application file for complete search history.

(56) References Cited

U.S. PATENT DOCUMENTS

| | | |
|---|---|---|
| 2012/0214037 A1 | 8/2012 | Hara |
| 2015/0044533 A1 | 2/2015 | Tode |

(Continued)

FOREIGN PATENT DOCUMENTS

| | | |
|---|---|---|
| WO | 2010116533 A1 | 10/2012 |
| WO | 2011016112 A1 | 1/2013 |

*Primary Examiner* — Victoria H Lynch
(74) *Attorney, Agent, or Firm* — Quinn IP Law

(57) ABSTRACT

A prismatic battery includes a prismatic battery can having an upper region, a vertical Z-direction along a height of the prismatic battery can, and a horizontal Y-direction along a width of the prismatic battery can. A plurality of stacked battery layers is disposed inside of the prismatic battery can. The stacked battery layers have an in-plane direction and a transverse direction that is perpendicular to the in-plane direction. The stacked battery layers have an orthotropic thermal conductivity that has a high, in-plane thermal conductivity in the in-plane direction and has a low, transverse thermal conductivity in the transverse direction. The stacked battery layers are folded inside of the prismatic battery can in an Inverted-U geometric configuration. The Inverted-U geometry is configured to provide a longer thermal delay time and a reduced peak temperature in response to a Thermal Runaway event occurring in an adjacent battery can.

19 Claims, 10 Drawing Sheets

(51) Int. Cl.
    *H01M 10/613*      (2014.01)
    *H01M 10/625*      (2014.01)
    *H01M 10/647*      (2014.01)
    *H01M 10/6554*      (2014.01)

(56)             References Cited

U.S. PATENT DOCUMENTS

2020/0358058 A1 * 11/2020 Murayama .......... H01M 50/227
2023/0261308 A1 * 8/2023 Pannala ................ H01M 50/22
                                                 429/72

* cited by examiner

Jelly-Roll

Inverted-U

U-Shaped

S-Shaped

165 C
@ 500 s

55 C

166 C
@ 500 s

55 C

PRISMATIC INVERTED-U BATTERY STACK GEOMETRY

INTRODUCTION

The present disclosure relates generally to electrochemical devices. More specifically, aspects of this disclosure relate to Lithium-ion batteries for use in electric motor vehicles and other electric-powered devices, such as electric-powered airplanes.

Current production motor vehicles, such as the modern-day automobile, are originally equipped with a powertrain that operates to propel the vehicle and power the vehicle's onboard electronics. In automotive applications, for example, the vehicle powertrain is generally typified by a prime mover that delivers driving torque through an automatic or manually shifted power transmission to the vehicle's final drive system (e.g., differential, axle shafts, corner modules, road wheels, etc.). Automobiles have historically been powered by a reciprocating-piston type internal combustion engine (ICE) assembly due to its ready availability and relatively inexpensive cost, light weight, and overall efficiency. Such engines include compression-ignited (CI) diesel engines, spark-ignited (SI) gasoline engines, two, four, and six-stroke architectures, and rotary engines, as some non-limiting examples. Hybrid-electric and full-electric vehicles (collectively "electric-drive vehicles"), on the other hand, utilize alternative power sources to propel the vehicle and, thus, minimize or eliminate reliance on a fossil-fuel based engine for tractive power.

A full-electric vehicle (FEV)—colloquially labeled an "electric car"—is a type of electric-drive vehicle configuration that altogether omits an internal combustion engine and attendant peripheral components from the powertrain system, relying instead on a rechargeable energy storage system (RESS) and a traction motor for vehicle propulsion. The engine assembly, fuel supply system, and exhaust system of an ICE-based vehicle are replaced with a single or multiple traction motors, rechargeable battery cans, and battery cooling and charging hardware in a battery-based FEV. Hybrid-electric vehicle (HEV) powertrains, in contrast, employ multiple sources of tractive power to propel the vehicle, most commonly operating an internal combustion engine assembly in conjunction with a battery-powered or fuel-can-powered traction motor. Since hybrid-type, electric-drive vehicles derive their power from sources other than the engine, HEV engines may be turned off, in whole or in part, while the vehicle is propelled by the electric motor(s).

High-voltage (HV) electrical systems govern the transfer of electricity between the traction motors and the rechargeable battery packs that supply the requisite power for operating many hybrid-electric and full-electric powertrains. To provide the power capacity and energy density needed to propel a vehicle at desired speeds for desired ranges, contemporary traction battery packs group multiple battery cans (e.g., 8-16+ cans/stack) into individual battery modules (e.g., 10-40+ modules/pack) that are electrically interconnected in series or parallel and mounted onto the vehicle chassis, e.g., by a battery pack housing or support tray. Located on a battery side of the HV electric system is a front-end DC-to-DC power converter that is electrically connected to the traction battery pack(s) in order to increase the supply of voltage to a main DC bus and a DC-to-AC power inverter module (PIM). A high-frequency bulk capacitor may be arranged across the positive and negative terminals of the main DC bus to provide electrical stability and store supplemental electrical energy. A dedicated Electronic Battery Control Module (EBCM), through collaborative operation with a Powertrain Control Module (PCM) and each motor's power electronics package, governs operation of the battery pack(s) and traction motor(s).

A battery array, such as a battery module, pack, etc., typically includes a plurality of battery cans in relatively close proximity to one another. Batteries may be broadly classified into primary and secondary batteries. Primary batteries, also referred to as disposable batteries, are intended to be used until depleted, after which they are simply replaced with new batteries. Secondary batteries, more commonly referred to as rechargeable batteries, employ specific chemistries permitting such batteries to be repeatedly recharged and reused, therefore offering economic, environmental, and case-of-use benefits compared to disposable batteries.

Rechargeable batteries may be used to power such diverse items as toys, consumer electronics, motor vehicles, and airplanes. Particular chemistries of rechargeable batteries, such as lithium-ion cans, as well as external factors, may cause internal chemical reactions generating significant amounts of thermal energy. Such abnormal chemical reactions may cause more heat to be generated by the battery can than is effectively withdrawn. Exposure of a battery can to elevated temperatures over prolonged periods may cause the can to experience a thermal runaway event. Accordingly, a thermal runaway propagation (TRP) event starting within an individual can may lead to the heat spreading to adjacent cans in the battery array and cause the thermal runaway event to affect the entire battery pack and affect nearby temperature-sensitive components, such as controllers, sensors, battery terminals and connectors, etc.

The individual cans of a lithium-ion battery pack may generate a significant amount of heat during charge and discharge cycles. This can-borne heat is produced primarily by exothermic chemical reactions and losses due to activation energy, chemical transport, and resistance to ionic migration. Within lithium-ion batteries, a series of exothermic and gas-generating reactions may take place as can temperatures rise that may push the battery assembly towards an unstable state. Such thermal events, if left unchecked, may lead to a more accelerated heat-generating state called "thermal runaway" (TR) or "thermal runaway propagation" (TRP), a condition in which the battery system is unable to return the internal battery components to normal operating temperatures. A TRP event can damage the battery pack and melt internal components. Battery modules, comprising multiple battery cans, may be supported by an actively-cooled, bottom cold plate to control the temperatures during battery charging and discharging operations.

SUMMARY

The present disclosure teaches an innovative stacking geometry of multiple internal layers of a rechargeable battery (e.g., a Lithium-ion battery) contained inside of a prismatic battery can for use in electric vehicles or other electric-powered devices. The improved battery stack geometry includes an Inverted U-shape configuration. The upper half of a battery can exhibits very high temperatures (e.g., 800 C) when the battery can experiences a Thermal Runaway (TR) event. The Inverted U stacking geometry has high thermal conductivity in the horizontal direction near the upper region of the battery can for better heat dissipation, while also providing higher thermal conductivity in the vertical direction near the bottom of the battery can for better heat extraction through an attached actively-cooled, bottom cold plate. This innovative stacking geometry provides a longer delay time (e.g., >1300 s) and a reduced peak temperature (e.g., <155 C) in response to a TR event occurring in an adjacent battery can. This innovative stacking geometry also allows a Thermal Response Barrier (TRB) layer to be significantly thinner (e.g., 50% thinner), thereby allowing for a greater battery pack energy density and/or a smaller battery pack size.

In one embodiment, a prismatic battery includes a prismatic battery can having an upper region, a vertical Z-direction along a height of the prismatic battery can, and a horizontal Y-direction along a width of the prismatic battery can. A plurality of stacked battery layers is disposed inside of the prismatic battery can. The stacked battery layers have an in-plane direction and a transverse direction that is perpendicular to the in-plane direction. The stacked battery layers have an orthotropic thermal conductivity that has a high, in-plane thermal conductivity in the in-plane direction and has a low, transverse thermal conductivity in the transverse direction. The stacked battery layers are folded inside of the prismatic battery can in an Inverted-U geometric configuration. The Inverted-U geometry is configured to provide a longer thermal delay time and a reduced peak temperature in response to a Thermal Runaway event occurring in an adjacent battery can.

Another embodiment relates to a prismatic battery that includes: a prismatic battery can having a Height/Width aspect ratio greater than 1.5, that also has an upper region, a vertical Z-direction along a height of the prismatic battery can, and a horizontal Y-direction along a width of the prismatic battery can. A plurality of stacked battery layers are disposed inside of the prismatic battery can; wherein the stacked battery layers have an in-plane direction and a transverse direction that is perpendicular to the in-plane direction. The stacked battery layers have an orthotropic thermal conductivity that has a high thermal conductivity in the in-plane direction and has a low thermal conductivity in the transverse direction. The stacked battery layers are configured inside of the prismatic battery can in such a way so that the thermal conductivity in the upper region of the prismatic battery can is high in the horizontal Y-direction (see FIG. 3). The stacked battery layers are folded in an "Inverted-U" geometry inside of the prismatic battery can. The ratio of the high, in-plane thermal conductivity divided by the low, transverse thermal conductivity of the stacked battery layers is typically greater than 10 for Lithium-ion batteries (e.g., equal to about 13). The Height/Width aspect ratio of the prismatic battery can may be greater than about 3. An upper region of the prismatic battery can may have a height that ranges from 10% to 20% of a total height of the prismatic battery can.

In another embodiment, the stacked battery layers include: a negative current collector layer, an anode electrode layer disposed adjacent to the negative current collector layer, a separator layer disposed adjacent to the anode electrode layer, a cathode electrode layer disposed adjacent to the separator layer; and a positive current collector layer disposed adjacent to the cathode electrode layer. The prismatic battery may be a prismatic Lithium-ion battery. The negative current collector layer may be made of copper. The anode electrode layer may be graphite, Lithium Titanate, Silicon/Carbon, or Tin/Cobalt alloy, or combinations thereof. The separator layer may be a micro-porous polyolefin polymer, such as micro-porous polyethylene (PE), micro-porous polypropylene (PP), or micro-porous polyethylene terephthalate (PET), or combinations thereof. The cathode electrode layer may be lithium-metal-oxide, $LiCoO_2$ (LCO), $LiMn_2O_4$ (LMO), $LiFePO_4$ (LFP), Nickel-Manganese-Cobalt oxide (NMC), or Nickel-Cobalt-Aluminum Oxide (NCA), or combinations thereof. The positive current collector layer may be made of aluminum.

Another embodiment relates to a prismatic battery pack that includes: a first prismatic battery can; an adjacent, second prismatic battery can; an actively-cooled, bottom cold plate disposed underneath the first and second prismatic battery cans; and a thermal response barrier (TRB) layer disposed in-between the first and second prismatic battery cans. The TRB layer reduces heat conduction from the first prismatic battery can to the second (adjacent) prismatic can in the event of a Thermal Runaway (TR) event in one of the prismatic battery cans. Each prismatic battery can may include stacked battery layers that are folded (i.e., wound) in an Inverted-U geometry. The time required to increase the temperature of an adjacent prismatic can after initiation of a thermal runaway event is longer when using an Inverted-U geometry inside of each prismatic battery can.

Another embodiment relates to an electric motor vehicle that includes: a vehicle body with a passenger compartment; a plurality of road wheels attached to the vehicle body; a traction motor attached to the vehicle body that is operable to drive one or more of the plurality of road wheels to thereby propel the electric motor vehicle; and a traction battery pack attached to the vehicle body and electrically connected to the traction motor. The traction battery pack includes a plurality of prismatic battery cans arranged in mutually parallel rows. Each prismatic battery can includes: a prismatic battery can having a Height/Width aspect ratio greater than 1.5, and preferably greater than 3. Each prismatic battery can includes an upper region, a vertical Z-direction along a height of the prismatic battery can, and a horizontal Y-direction along a width of the prismatic battery can. A plurality of stacked battery layers is disposed inside of the prismatic battery can; wherein the stacked battery layers have an in-plane direction and a transverse direction that is perpendicular to the in-plane direction. The stacked battery layers have an orthotropic thermal conductivity that has a high thermal conductivity in the in-plane direction and has a low thermal conductivity in the transverse direction. The stacked battery layers are configured inside of the prismatic battery can in such a way so that the thermal conductivity in the upper region of the prismatic battery can is high in the horizontal Y-direction. The stacked battery layers are configured (i.e., folded) in an "Inverted-U" geometry inside of the prismatic battery can. The Height/Width ratio of the prismatic battery can may be greater than 3, and the ratio of the high, in-plane thermal conductivity divided by the low, transverse thermal conductivity of the plurality of stacked battery layers may be greater than 10. The prismatic battery pack may include prismatic Lithium-ion batteries.

The above Summary does not represent every embodiment or every aspect of the present disclosure. Rather, the foregoing Summary merely provides a synopsis of some of the novel concepts and features set forth herein. The above features and advantages, and other features and attendant advantages of this disclosure, will be readily apparent from the following Detailed Description of illustrated examples and representative modes for carrying out the disclosure when taken in connection with the accompanying drawings and appended claims. Moreover, this disclosure expressly includes any and all combinations and sub-combinations of the elements and features presented above and below.

Figures 10A, 10B, 11A, 11B:
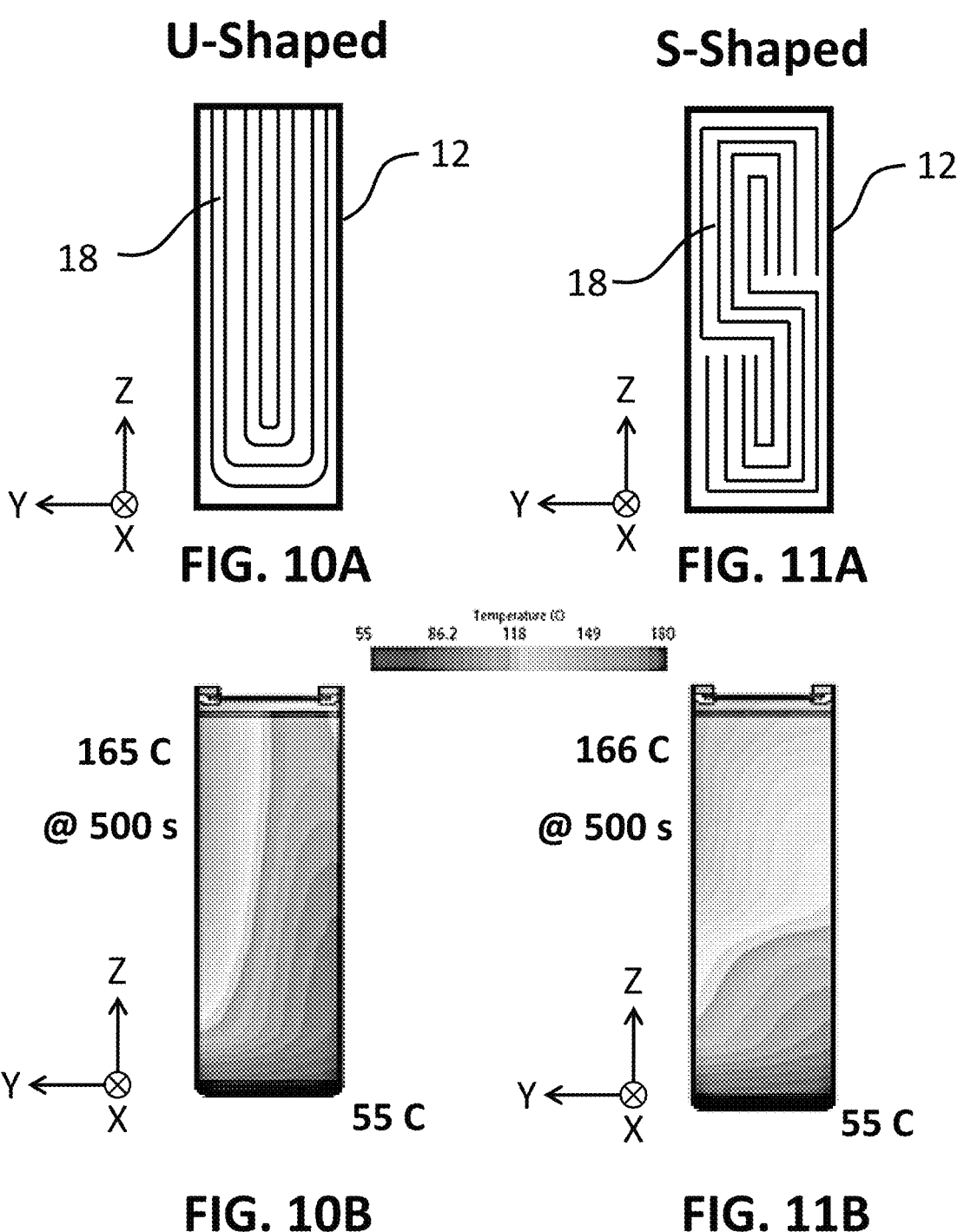

FIG. 10A shows a schematic 2-D cross-section side view of an example of a single prismatic battery can, with the stacked battery layers folded in an "U-Shaped" geometry, according to the present disclosure.

FIG. 10B shows a 2-D contour plot of an example of calculated temperatures of a Lithium-ion can "B" at 500 seconds after initiation of a Thermal Runaway Propagation event in adjacent can "A", for the U-Shaped layer geometry shown in FIG. 10A, according to the present disclosure.

FIG. 11A shows a schematic 2-D cross-section side view of an example of a single prismatic battery can, with the stacked battery layers folded in an "S-Shaped" geometry, according to the present disclosure.

FIG. 11B shows a 2-D contour plot of an example of calculated temperatures of a Lithium-ion can "B" at 500 seconds after initiation of a Thermal Runaway Propagation event in adjacent can "A", for the S-Shaped layer geometry shown in FIG. 11A, according to the present disclosure.

Figure 12:
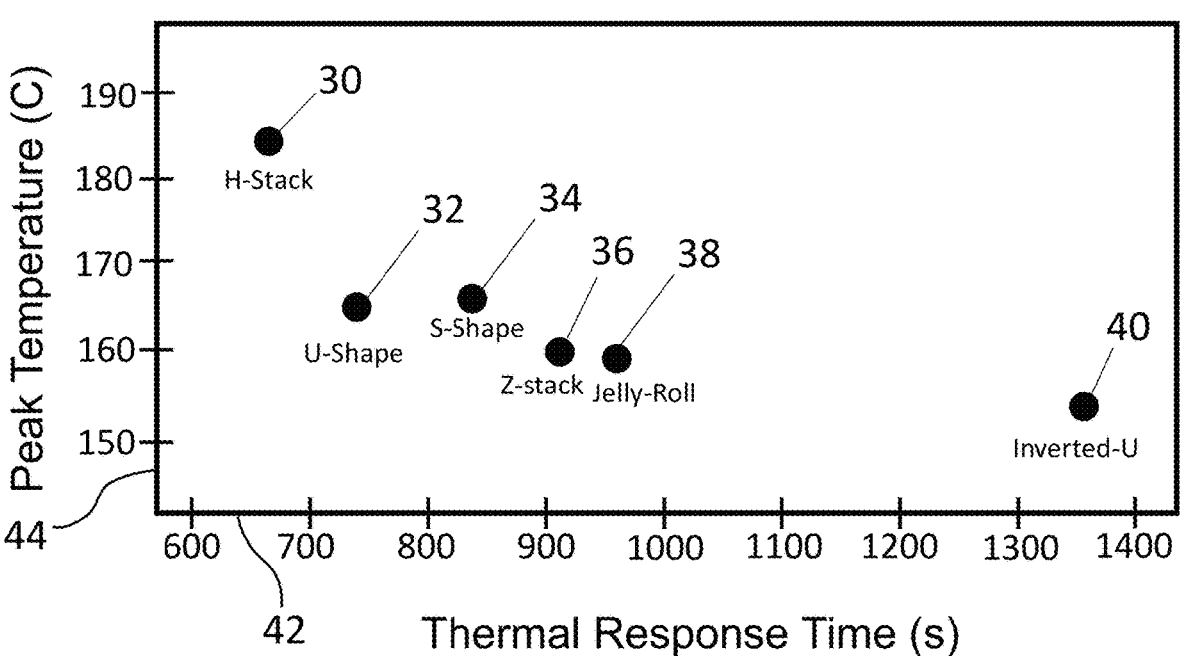

FIG. 12 shows an example of a summary plot of calculated Peak Temperatures (C) and Thermal Runway initiation time(s) for six different Lithium-ion prismatic can layer winding designs of adjacent prismatic battery can "B", from the table of results shown in Table 2, according to the present disclosure.

DETAILED DESCRIPTION

This disclosure is susceptible of embodiment in many different forms. Representative embodiments of the disclosure are shown in the drawings and will herein be described in detail with the understanding that these embodiments are provided as an exemplification of the disclosed principles, not limitations of the broad aspects of the disclosure. To that extent, elements and limitations that are described, for example, in the Abstract, Introduction, Summary, and Detailed Description sections, but not explicitly set forth in the claims, should not be incorporated into the claims, singly or collectively, by implication, inference, or otherwise.

For purposes of the present detailed description, unless specifically disclaimed: the singular includes the plural and vice versa; the words "and" and "or" shall be both conjunctive and disjunctive; the words "any" and "all" shall both mean "any and all"; and the words "including," "containing," "comprising," "having," and the like, shall each mean "including without limitation." Moreover, words of approximation, such as "about," "almost," "substantially," "generally," "approximately," and the like, may each be used herein in the sense of "at, near, or nearly at," or "within 0-5% of," or "within acceptable manufacturing tolerances," or any logical combination thereof, for example.

Unless specifically stated from context, as used herein, the term "about" is understood as within a range of normal tolerance in the art, for example within 2 standard deviations of the mean. "About" may be understood as within 10%, 5%, 1%, 0.5%, 0.1%, 0.05%, or 0.01% of the stated value. "About" can alternatively be understood as implying the exact value stated. Unless otherwise clear from the context, the numerical values provided herein are modified by the term "about."

Lastly, directional adjectives and adverbs, such as fore, aft, inboard, outboard, starboard, port, vertical, horizontal, upward, downward, front, back, left, right, etc., may be with respect to a motor vehicle, such as a forward driving direction of a motor vehicle when the vehicle is operatively oriented on a horizontal driving surface. The phrases "winding design" and "battery stack geometry" are used interchangeably. The phrases "battery can" and and "prismatic can" are used interchangeably.

This disclosure presents innovative battery stack geometry (i.e., winding designs) for orienting the multiple internal layers of a rechargeable battery (e.g., a Lithium-ion battery) inside of a prismatic battery can for use in electric vehicles and other devices. The improved battery stack geometry includes an Inverted-U and configuration. With a bottom cold plate, the top half of an adjacent battery can "B" shows hot spots (150 C to 190 C) when battery can "A" experiences a Thermal Runaway Propagation (TRP) event. The Inverted U-shape geometry enables high thermal conductivity in the horizontal direction near the upper region of a battery can for better heat dissipation, while also providing higher thermal conductivity in the vertical direction near the bottom of the battery can for better heat extraction through the bottom cold plate. This innovative stacking geometry provide longer thermal response times (e.g., >1350 s) and reduced peak temperatures (e.g., <155 C) after a TR event occurs in adjacent battery can "A", wherein both of these results are highly desirable.

Figure 1:
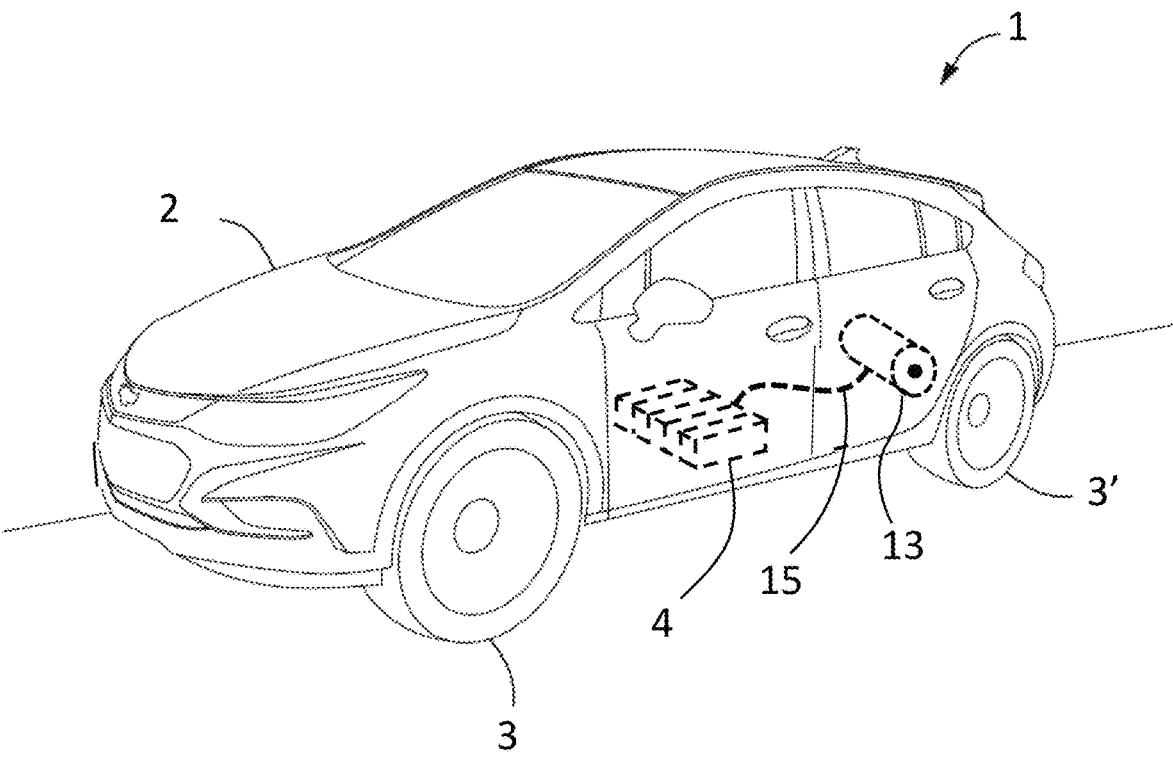
FIG. 1 shows a schematic, perspective view of an example of an electric vehicle with a Lithium-ion battery pack, according to the present disclosure.

FIG. 1 shows a schematic perspective view of an example of an electric motor vehicle 1 with a battery pack 4, according to the present disclosure. Electric motor vehicle 1 includes a vehicle body 2, a plurality of road wheels 3, 3', etc. attached to vehicle body 2, and a battery pack 4 located in electric motor vehicle 1. Electric motor vehicle 1 further comprises one or more electric traction motors 13 attached to vehicle body 2 that are operable to drive one or more of the road wheels 3, 3', etc. that propels electric motor vehicle 1. The battery pack 4 is physically attached to vehicle body 2 and is electrically connected to the traction motor(s) 13 with electrical cable 15.

Figure 2:
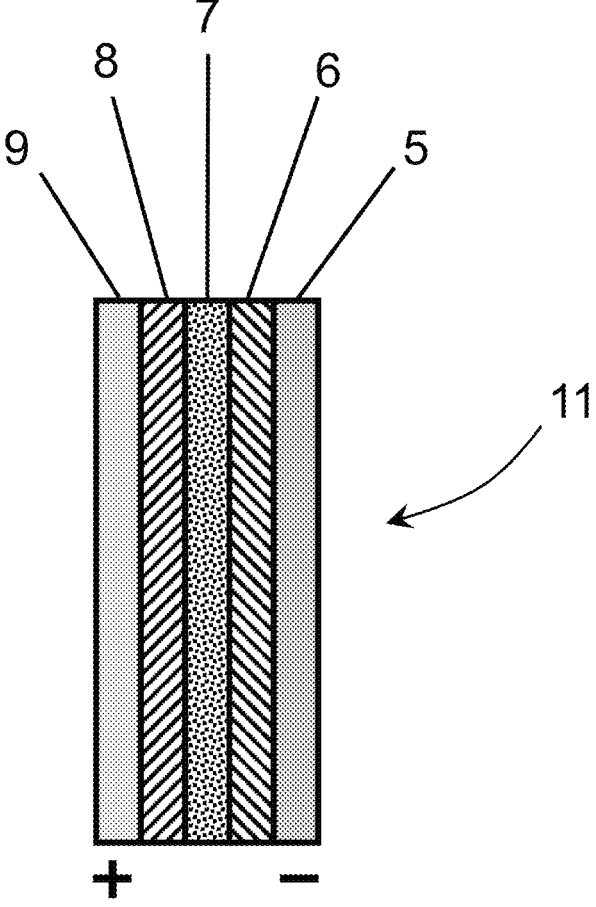
FIG. 2 shows a schematic, cross-section view of an example of a basic Lithium-ion battery stack comprising five stacked battery layers, according to the present disclosure.

FIG. 2 shows a schematic cross-section view of an example of a Lithium-ion battery stack comprising five stacked battery layers, according to the present disclosure. The five stacked battery layers of a Lithium-ion battery can 11 comprise: a negative current collector layer 5, an anode electrode layer 6 disposed adjacent to the negative current collector layer 5, a separator layer 7 disposed adjacent to the anode electrode layer 6, a cathode electrode layer 8 disposed adjacent to the separator layer 7 opposite the anode electrode layer 5, and a positive current collector layer 9 disposed adjacent to the cathode electrode layer 8. The negative current collector layer 5 can comprise a copper sheet. The anode electrode layer 6 can comprise a material chosen from: graphite, Lithium Titanate, Silicon/Carbon, or Tin/Cobalt alloy, and combinations thereof. The separator layer 7 can comprise a micro-porous polyolefin polymer chosen from: micro-porous polyethylene (PE), micro-porous polypropylene (PP), or micro-porous polyethylene terephthalate (PET), and combinations thereof. The cathode electrode layer 8 can comprise a compound chosen from: lithium-metal-oxides, $LiCoO_2$ (LCO), $LiMn_2O_4$ (LMO), $LiFePO_4$ (LFP), Nickel-Manganese-Cobalt oxides (NMC), or Nickel-Cobalt-Aluminum Oxide (NCA), and combinations thereof. Finally, in some embodiments, the positive current collector layer 9 can comprise aluminum. The five stacked battery layers may be contained within a sealed, prismatic battery can (i.e., housing), with positive and negative tabs that protrude from the top of the can.

Figure 3:
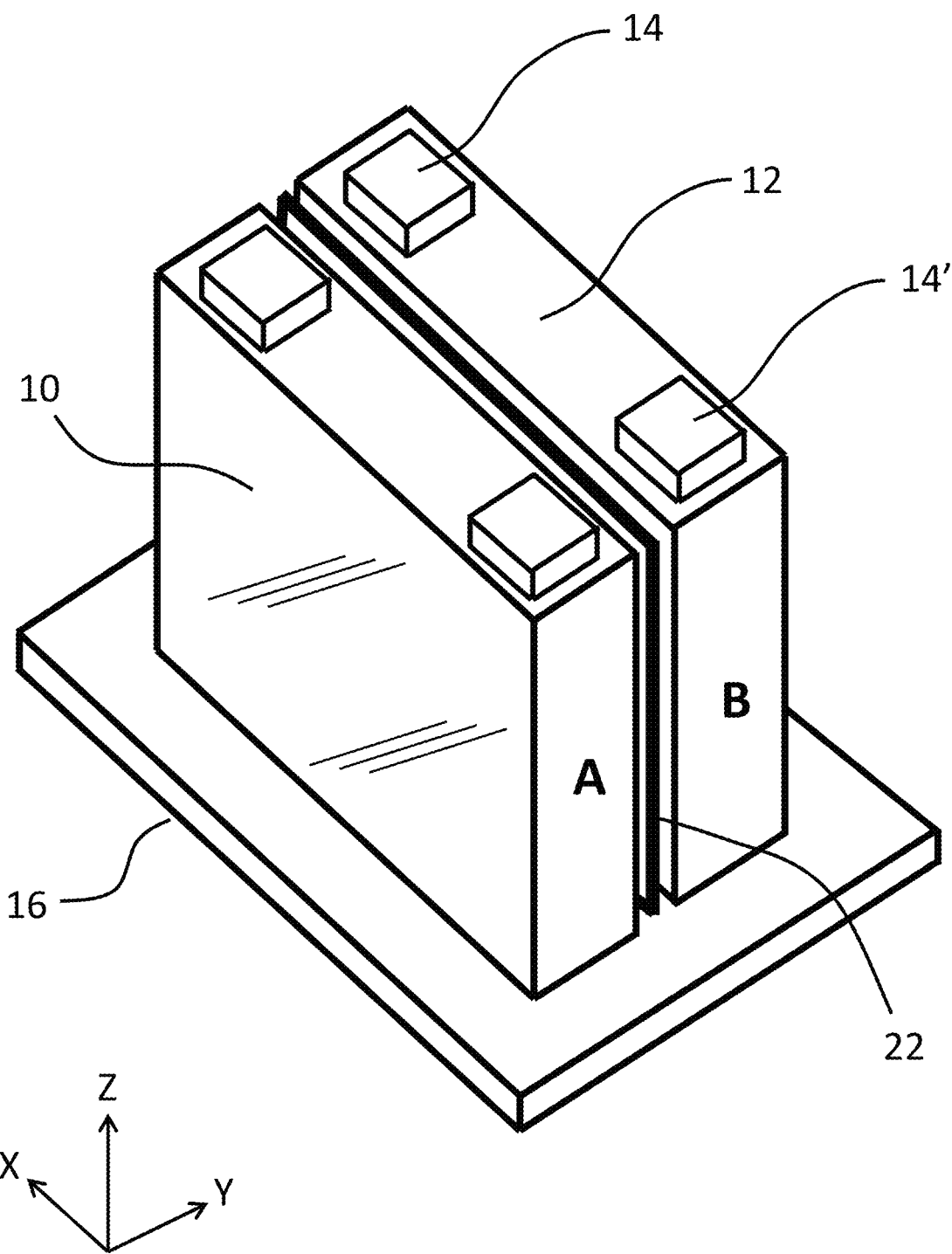
FIG. 3 shows a 3-D perspective view of an example of a pair of prismatic battery cans "A" and "B", arranged side-by-side, with a thermal response barrier layer disposed in-between can "A" and can "B", with both cans sitting on a bottom cold plate, according to the present disclosure.

FIG. 3 shows a 3-D perspective view of an example of a first prismatic battery can "A" 10 and an adjacent, second prismatic battery can "B" 12, arranged side-by-side, with a Thermal Response Barrier (TRB) layer 22 disposed in-between battery can "A" (10) and battery can "B" (12), according to the present disclosure. Prismatic battery cans 10 and 12 are supported by an actively-cooled, bottom cold plate 16. Positive and negative electrodes 14, 14' are located on top of prismatic battery cans 10 and 12.

Figure 4:
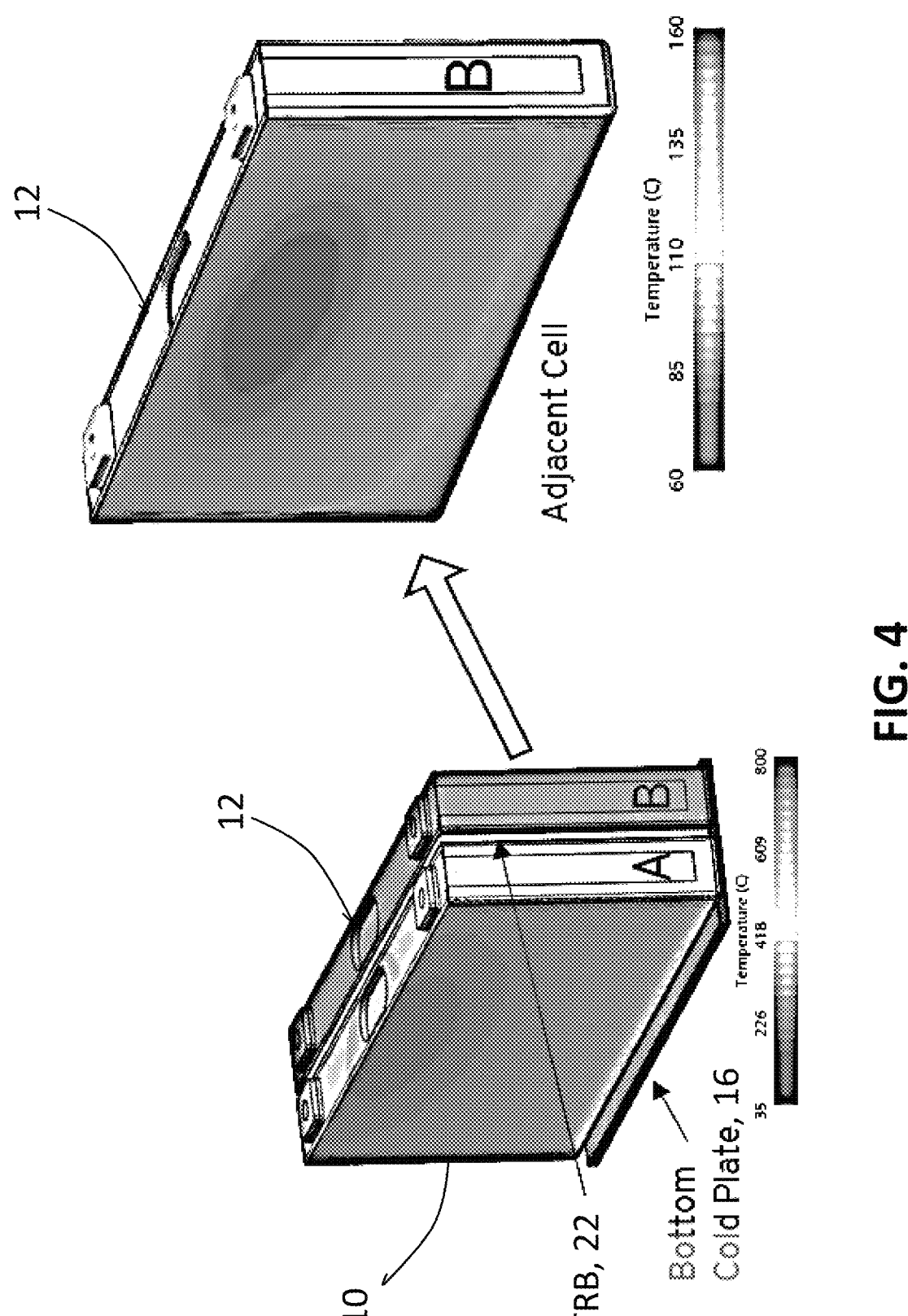
FIG. 4 shows a schematic 3-D perspective view of a pair of prismatic battery cans "A" and "B", arranged side-by-side, with a thermal response barrier (TRB) disposed in-between can "A" and can "B", with both cans sitting on an actively-cooled, bottom cold plate, according to the present disclosure.

FIG. 4 shows a schematic 3-D perspective view of a pair of prismatic battery cans "A" (10) and "B" (12), arranged side-by-side, with a Thermal Response Barrier (TRB) 22 disposed in-between first can "A" and second can "B", with both cans being supported by an actively-cooled, bottom cold plate 16, according to the present disclosure. This figure also shows an example of color-coded temperature contour plots of finite volume calculations of temperature profiles throughout each of prismatic battery cans 10 and 12, in response to a thermal runaway propagation (TRP) overheating event in the first prismatic battery can "A" (can 10), starting at time=0. The drawing on the left-hand side of FIG. 4 shows that the peak temperature of Thermal Runaway can "A" has reached a maximum of 800 C (which is sufficient to melt aluminum). However, the peak temperature of adjacent can "B" (battery can 12) has only reached 160 C, which is due primarily to the insulating effect of the TRB layer 22. TRB layer 22 may be made of a material that has a low thermal conductivity and high melting point (e.g., a porous ceramic layer). The thickness of TRB layer 22 may be 1-3 mm. Note that the battery pack's stored energy density increases as the thickness of TRB layer 22 decreases.

Figure 5A:
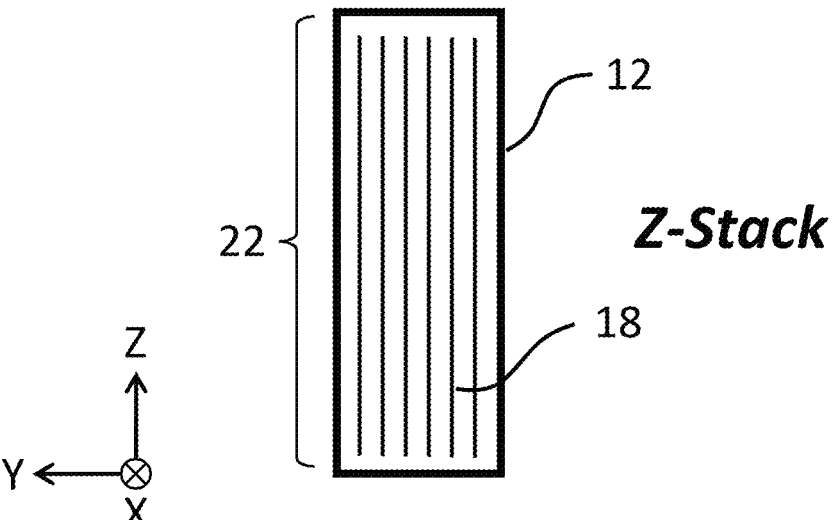
FIG. 5A shows a schematic 2-D cross-section side view an example of a prismatic battery can, with the stacked battery layers arranged vertically along the Z-direction (i.e., "Z-stack"), according to the present disclosure.

FIG. 5A shows a schematic 2-D cross-section side view of an example of a prismatic battery can 12, with the stacked battery layers 18 arranged vertically along the Z-direction (i.e., "Z-stack"), according to the present disclosure. This Z-stacked geometry 22 is used in Lithium-ion batteries for electric vehicles. The prismatic battery can 12 may be, for example, 90 mm tall by 25 mm wide; and can have a Height/Width ratio greater than about 1.5, and preferably greater than about 3.0. Battery can 12 has a vertical Z-direction in the vertical direction, and a horizontal Y-direction in the horizontal direction.

Figure 5B:
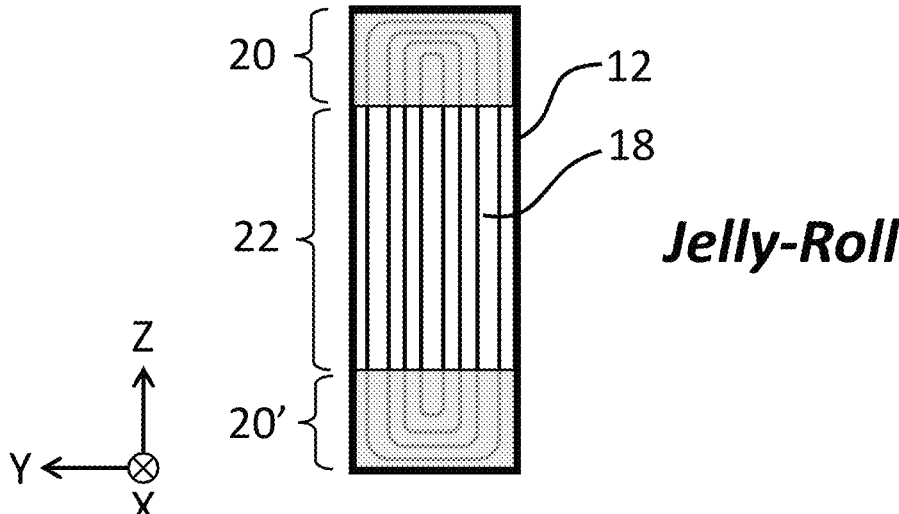
FIG. 5B shows a schematic 2-D cross-section side view an example of a prismatic battery can, with the stacked battery layers folded in a "Jelly-Roll" geometry, according to the present disclosure.

FIG. 5B shows a schematic 2-D cross-section side view of an example of a prismatic battery can 12, with the stacked battery layers 18 folded in a "Jelly-Roll" geometry, according to the present disclosure. In this configuration, the stacked battery layers 18 are folded vertically along the Z-direction in the middle section 22 of battery can 12. However, the stacked battery layers 18 are folded over each other at the top and bottom regions 20 and 20' of battery can 12, respectively. This configuration defines the "Jelly-Roll" geometry. The stacked battery layers have an in-plane direction and a transverse direction that is perpendicular to the in-plane direction; and the stacked battery layers have an orthotropic thermal conductivity that has a high thermal conductivity (e.g., 18.4 W-m-K for Lithium-ion batteries) in the in-plane direction, and has a low thermal conductivity (e.g., 1.4 W/m-K for Lithium-ion batteries) in the transverse direction. The ratio of high/low thermal conductivity for Lithium-ion batteries is greater than about 10 (e.g., 13). The plurality of stacked battery layers 18 is folded inside of the prismatic battery can 12 in such a way so that the thermal conductivity in both the upper region 20 and the lower region 20' of the prismatic battery can 12 is high in the horizontal Y-direction. In the middle region 22 of battery can 12, the thermal conductivity is high in the in-plane Z-direction, and low in the transverse Y-direction. The upper and lower regions 20, 20' of the prismatic battery can 12 have a vertical height (e.g., 12.5 mm) that ranges from 10% to 20% of a total vertical height (e.g., 90 mm) of the prismatic battery can 12. This configuration defines the "Jelly-Roll" winding geometry.

Figure 5C:
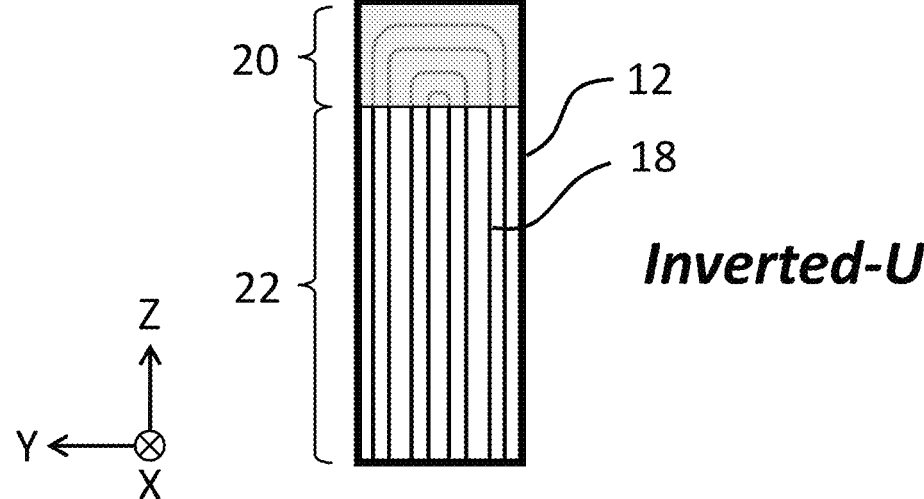
FIG. 5C shows a schematic 2-D cross-section side view an example of a prismatic battery can, with the stacked battery layers folded in an "Inverted-U" geometry, according to the present disclosure.

FIG. 5C shows a schematic 2-D cross-section side view an example of a prismatic battery can, with the stacked battery layers folded in an "Inverted-U" geometry, according to the present disclosure. In this configuration, the stacked battery layers 18 are arranged vertically along the Z-direction in the middle-to-bottom region 22 of battery can 12. However, the stacked battery layers 18 are folded over each other in the upper region 20 of battery can 12. This configuration defines the "Inverted-U" geometry. The stacked battery layers have an in-plane direction and a transverse direction that is perpendicular to the in-plane direction. The stacked battery layers have an orthotropic thermal conductivity that has a high thermal conductivity (e.g., 18.4 W-m-K for Lithium-ion batteries) in the in-plane direction, and has a low thermal conductivity (e.g., 1.4 W/m-K for Lithium-ion batteries) in the transverse direction. The ratio of high/low thermal conductivity for Lithium-ion batteries is greater than about 10 (e.g., 13). The plurality of stacked battery layers 18 is folded inside of the prismatic battery can 12 in such a way that the thermal conductivity in the upper region 20 of the prismatic battery can 12 is high in the horizontal Y-direction. In the middle-to-bottom region 22 of battery can 12, the thermal conductivity is high in the in-plane Z-direction, and low in the transverse Y-direction. The upper regions 20 of the prismatic battery can 12 have a height (e.g., 12.5 mm) that ranges from 10% to 20% of a total height (e.g., 90 mm) of the prismatic battery can 12.

Table 1 shows orthotropic thermal conductivity values ($k_x$, $k_y$, $k_z$) of a Lithium-ion battery, for different regions of the stacked battery layers, according to the present disclosure. In the middle region 22 (see FIGS. 5B and 5C) the thermal conductivity of the stacked battery layers 18 is high in the in-plane X-direction and high in the in-plane Z-direction (i.e., parallel to the in-plane direction of battery layers 18). However, the thermal conductivity is very low (e.g., <10%) in the transverse Y-direction (i.e., perpendicular to the in-plane direction of the stacked battery layers 18). In the upper region 20 of FIG. 5C, the in-plane direction of battery layers 18 is oriented parallel to the Y-direction, which causes the Y-direction thermal conductivity, $k_y$, to be high in upper region 20. Note that a ratio of the high, in-plane thermal conductivity to the low, transverse thermal conductivity is greater than about 10.0 (e.g., 13.0).

TABLE 1

| Orthotropic Thermal Conductivity (W/m-K) | | | |
| --- | --- | --- | --- |
| Region | $k_x$ | $k_y$ | $k_z$ |
| 22 | 18.4 | 1.4 | 18.4 |
| 20 | 18.4 | 18.4 | 1.4 |

Figures 6A, 6B, 7A, 7B:
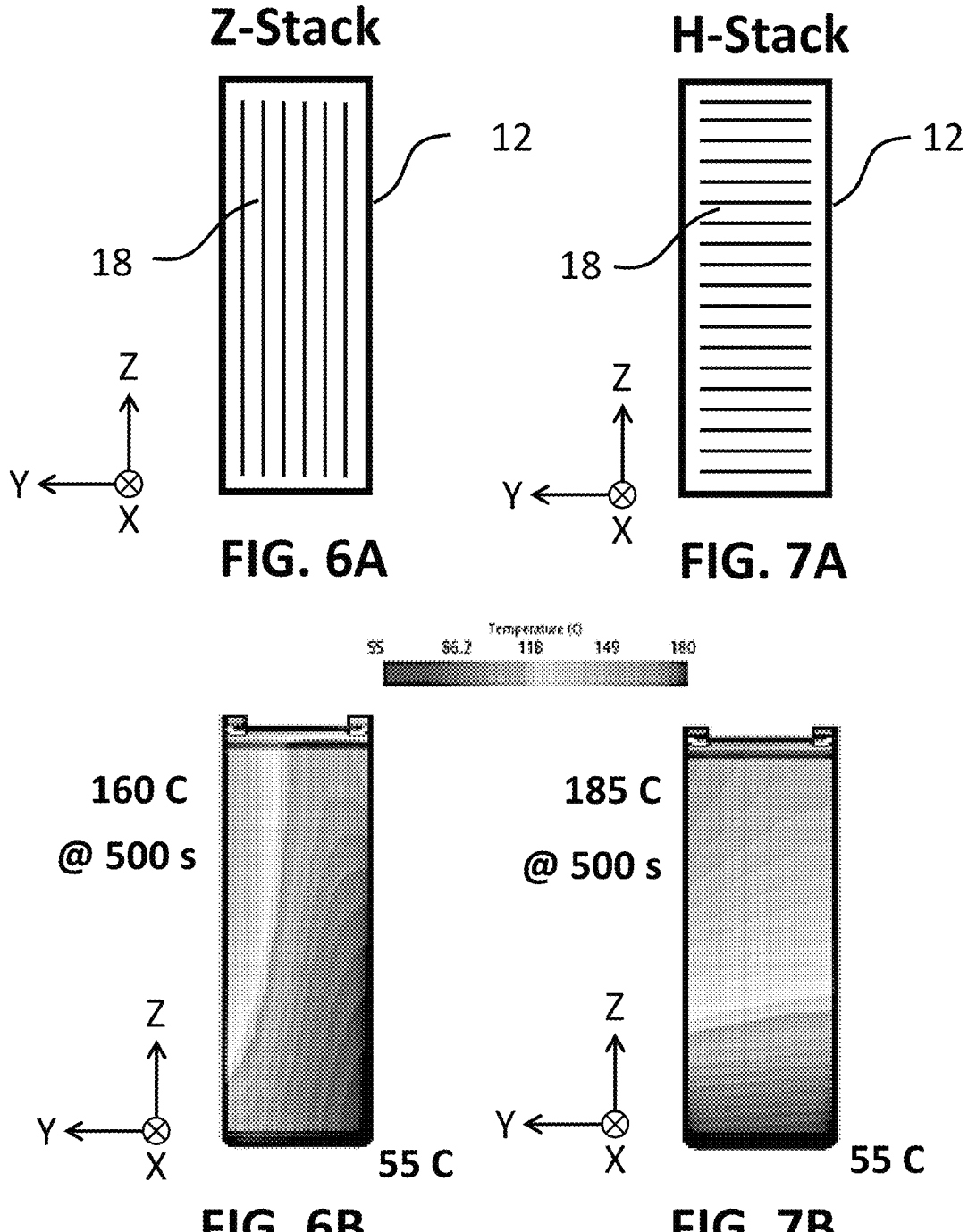
FIG. 6A shows a schematic 2-D cross-section side view of an example of a single prismatic battery can, with the stacked battery layers arranged vertically along the Z-direction ("Z-stack"), according to the present disclosure.
FIG. 6B shows a 2-D contour plot of an example of calculated temperatures of a Lithium-ion can "B" at 500 seconds after initiation of a Thermal Runaway Propagation event in adjacent can "A", for the Z-stack layer geometry shown in FIG. 6A, according to the present disclosure.
FIG. 7A shows a schematic 2-D cross-section side view of an example of a single prismatic battery can, with the stacked battery layers arranged horizontally along the Y-direction ("H-stack"), according to the present disclosure.
FIG. 7B shows a 2-D contour plot of an example of calculated temperatures of a Lithium-ion can "B" at 500 seconds after initiation of a Thermal Runaway Propagation event in adjacent can "A", for the H-stack layer geometry shown in FIG. 7A, according to the present disclosure.

FIG. 6A shows a schematic 2-D cross-section side view of an example of a single prismatic battery can 12, with the stacked battery layers 18 arranged vertically along the Z-direction ("Z-stack"), according to the present disclosure.

FIG. 6B shows a 2-D contour plot of an example of calculated temperatures of a Lithium-ion can "B" at 500 seconds after initiation of a Thermal Runaway Propagation event in adjacent can "A", for the Z-stack layer geometry shown in FIG. 6A, according to the present disclosure. This contour plot shows the results of a finite volume calculation of the transient thermal response of the midplane of can "B" adjacent to a can "A" (which is undergoing a Thermal Runaway (TR) event, starting at time=0). In this example, at time=500 s, the peak temperature of can "B" (12) is equal to 160 C. The temperature at the bottom of can "B" is equal to 55 C (due to the bottom cold plate 16).

FIG. 7A shows a schematic 2-D cross-section side view of an example of a prismatic battery can 12, with the stacked battery layers 18 arranged horizontally along the Y-direction ("H-stack"), according to the present disclosure.

FIG. 7B shows a 2-D contour plot of an example of calculated temperatures of a Lithium-ion can "B" at 500 seconds after initiation of a Thermal Runaway Propagation event in adjacent can "A", for the "H-stack" layer geometry shown in FIG. 7A, according to the present disclosure. This contour plot shows the results of a finite volume calculation of the transient thermal response of the midplane of the can "B" adjacent to a can "A" (which is undergoing a Thermal Runaway Propagation (TRP) event, starting at time=0). In this example, at time=500 s, the peak temperature of can "B" (12) is equal to 185 C. The temperature at the bottom of can "B" is equal to 55 C (due to the bottom cold plate). The higher peak temperature in this example is due to the low thermal conductivity in the Z-direction for this H-Stack geometry.

Figures 8A, 8B, 9A, 9B:
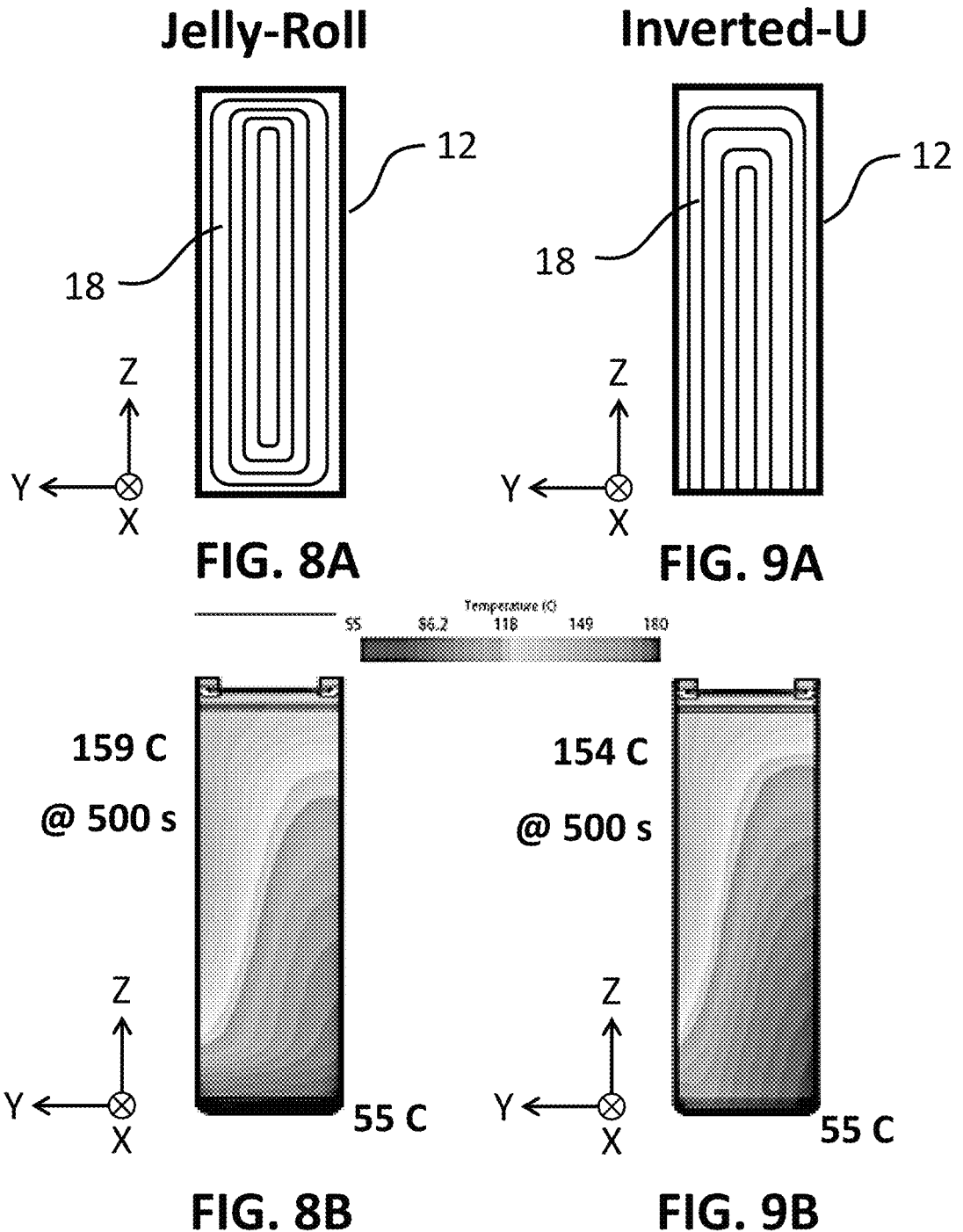
FIG. 8A shows a schematic 2-D cross-section side view of an example of a single prismatic battery can, with the stacked battery layers folded in a "Jelly-Roll" geometry, according to the present disclosure.
FIG. 8B shows a 2-D contour plot of an example of calculated temperatures of a Lithium-ion can "B" at 500 seconds after initiation of a Thermal Runaway Propagation event in adjacent can "A", for the Jelly-Roll layer geometry shown in FIG. 8A, according to the present disclosure.
FIG. 9A shows a schematic 2-D cross-section side view of an example of a single prismatic battery can, with the stacked battery layers folded in an "Inverted-U" geometry, according to the present disclosure.
FIG. 9B shows a 2-D contour plot of an example of calculated temperatures of a Lithium-ion can "B" at 500 seconds after initiation of a Thermal Runaway Propagation event in adjacent can "A", for the Inverted-U layer geometry shown in FIG. 9A, according to the present disclosure.

FIG. 8A shows a schematic 2-D cross-section side view of an example of a single prismatic battery can 12, with the stacked battery layers 18 folded in a "Jelly-Roll" geometry, according to the present disclosure.

FIG. 8B shows a 2-D contour plot of an example of calculated temperatures of a Lithium-ion can "B" at 500 seconds after initiation of a Thermal Runaway Propagation event in adjacent can "A", for the Jelly-Roll layer geometry shown in FIG. 8A, according to the present disclosure. This contour plot shows the results of a finite volume calculation of the transient thermal response of the midplane of the can "B" adjacent to a can "A" (which is undergoing a Thermal Runaway (TR) event, starting at time=0). In this example, at time=500 s, the peak temperature of can "B" (12) is equal to 159 C. The temperature at the bottom of can "B" is equal to 55 C (due to the bottom cold plate). The lower peak temperature in this example is due to the high thermal conductivity in the Y-direction for this Jelly-Roll geometry.

FIG. 9A shows a schematic 2-D cross-section side view of an example of a single prismatic battery can 12, with the stacked battery layers 18 folded in an "Inverted-U" geometry, according to the present disclosure.

FIG. 9B shows a 2-D contour plot of an example of calculated temperatures of a Lithium-ion can "B" at 500 seconds after initiation of a Thermal Runaway Propagation event in adjacent can "A", for the Inverted-U layer geometry shown in FIG. 9A, according to the present disclosure. This contour plot shows the results of a finite volume calculation of the transient thermal response of the midplane of the can "B" adjacent to a can "A" (which is undergoing a Thermal Runaway Propagation (TRP) event, starting at time=0). In this example, at time=500 s, the peak temperature of can "B" (12) is equal to 154 C. The temperature at the bottom of can "B" is equal to 55 C (due to the bottom cold plate). The lower peak temperature in this example is due to the high thermal conductivity in the Y-direction at the top of this Inverted-U geometry.

FIG. 10A shows a schematic 2-D cross-section side view of an example of a single prismatic battery can 12, with the stacked battery layers 18 folded in an "U-Shaped" geometry, according to the present disclosure.

FIG. 10B shows a 2-D contour plot of an example of calculated temperatures of a Lithium-ion can "B" at 500 seconds after initiation of a Thermal Runaway event in adjacent can "A", for the U-Shaped layer geometry shown in FIG. 10A, according to the present disclosure. This plot shows the results of a finite volume calculation of the transient thermal response of the midplane of the can "B" adjacent to a can "A" (which is undergoing a Thermal Runaway (TR) event, starting at time=0). In this example, at time=500 s, the peak temperature of can "B" (12) is equal to 165 C. The temperature at the bottom of can "B" is equal to 55 C (due to the bottom cold plate).

FIG. 11A shows a schematic 2-D cross-section side view of an example of a single prismatic battery can 12, with the stacked battery layers 18 folded in an "S-Shaped" geometry, according to the present disclosure.

FIG. 11B shows a 2-D contour plot of an example of calculated temperatures of a Lithium-ion can "B" at 500 seconds after initiation of a Thermal Runaway event in adjacent can "A", for the S-Shaped layer geometry shown in FIG. 11A, according to the present disclosure. This plot shows the results of a finite volume calculation of the transient thermal response of the midplane of the can "B" adjacent to a can "A" (which is undergoing a Thermal Runaway (TR) event, starting at time=0). In this example, at time=500 s, the peak temperature of can "B" (12) is equal to 166 C. The temperature at the bottom of can "B" is equal to 55 C (due to the bottom cold plate).

Table 2 summarizes the calculated peak temperatures and thermal response times for reaching the peak temperature, for the six different stacked Lithium-ion battery layer geometries shown in FIGS. 6-11, according to the present disclosure. The best performing winding design is the "Inverted-U" stacking geometry, which has the lowest peak temperature (154 C) and the longest response time (1360 s), which is 100% greater than the thermal response time for the worst-can H-stack design. The worst battery design is the H-stacked geometry, which has a higher peak temperature of 185 C and a shorter thermal response time of 675 s. A longer thermal response time is desirable because it gives more time for the battery pack and support system(s) to react to a TRP event.

For a bottom cold plate module design, the Inverted-U geometry has the lowest peak temperature due to better heat dissipation near the upper region 20, without adversely affecting cold plate heat extraction. This results in a significant increase in the adjacent battery can's thermal response time, as compared to Z-stack and Jelly-Roll winding geometries.

What is claimed is:

1. A prismatic battery, comprising:
a prismatic battery can comprising an upper region, a vertical Z-direction along a height of the prismatic battery can, and a horizontal Y-direction along a width of the prismatic battery can; and
a plurality of stacked battery layers disposed inside of the prismatic battery can;
wherein the plurality of stacked battery layers has an in-plane direction and a transverse direction that is perpendicular to the in-plane direction;
wherein the plurality of stacked battery layers has an orthotropic thermal conductivity that has an in-plane thermal conductivity in the in-plane direction and a transverse thermal conductivity in the transverse direction;
wherein the in-plane thermal conductivity is greater than the transverse thermal conductivity;
wherein the plurality of stacked battery layers is configured inside of the prismatic battery can in an Inverted-U geometry; and
wherein the in-plane thermal conductivity in the upper region of the prismatic battery can is higher in the horizontal Y-direction than the transverse thermal conductivity in the vertical Z-direction.

2. The prismatic battery of claim 1, wherein a ratio of the in-plane thermal conductivity divided by the transverse thermal conductivity of the plurality of stacked battery layers is greater than about 10.0.

3. The prismatic battery of claim 1, wherein an aspect ratio of a height of the prismatic battery can divided by a width of the prismatic battery can is greater than about 1.5.

TABLE 2

Summary of Calculated Temperatures and Thermal Response Times

| Property | Z-Stack | H-Stack | Jelly-Roll | Inverted-U | U-Shaped | S-Shaped |
|---|---|---|---|---|---|---|
| Cell "B" Thermal Response Time (s) | 916 s | 675 s | 968 s | 1360 s | 750 s | 850 s |
| Maximum Temperature (C.) | 160 C. | 185 C. | 159 C. | 154 C. | 165 C. | 166 C. |

FIG. 12 shows an example of a summary plot of calculated Peak Temperatures (C) and Thermal Response Times(s) for six different Lithium-ion can layer winding designs (shown in FIGS. 7-12) of adjacent battery can "B", taken from the table of results shown in Table 2, according to the present disclosure. Each data point corresponds to the following winding designs: H-Stack (30); U-Shape (32); S-Shape (34); Z-Stack (36); Jelly-Roll (38); and Inverted-U (40). The X-axis 42 of the graph shown in FIG. 12 is the Thermal Response Time (seconds), and the Y-axis 44 is the Peak Temperature (C). The worst performing winding design is the H-stack geometry 30, which has a high peak temperature of 185 C and a short thermal response time of 675 s. The best performing winding design is the Inverted-U geometry 40, which has a low peak temperature of 154 C and a much longer thermal response time of 1360 s.

4. The prismatic battery of claim 3, wherein the aspect ratio of the height of the prismatic battery can divided by the width of the prismatic battery can is greater than about 3.0.

5. The prismatic battery of claim 1, wherein the upper region of the prismatic battery can has a height that ranges from 10% to 20% of a total height of the prismatic battery can.

6. The prismatic battery of claim 1, wherein the plurality of stacked battery layers comprises
a negative current collector layer;
an anode electrode layer disposed adjacent to the negative current collector layer;
a separator layer disposed adjacent to the anode electrode layer;
a cathode electrode layer disposed adjacent to the separator layer opposite the anode electrode layer; and a positive current collector layer disposed adjacent to the cathode electrode layer.

7. The prismatic battery of claim 6, wherein the prismatic battery can comprises a Lithium-ion battery;

wherein the negative current collector layer comprises copper;

wherein the anode electrode layer comprises a material chosen from graphite, Lithium Titanate, Silicon/Carbon, or Tin/Cobalt alloy, and combinations thereof, wherein the separator layer comprises a micro-porous polyolefin polymer chosen from micro-porous polyethylene (PE), micro-porous polypropylene (PP), or micro-porous polyethylene terephthalate (PET), and combinations thereof;

wherein the cathode electrode layer comprises a compound chosen from lithium-metal-oxides, $LiCoO_2$ (LCO), $LiMn_2O_4$ (LMO), $LiFePO_4$ (LFP), Nickel-Manganese-Cobalt oxides (NMC), or Nickel-Cobalt-Aluminum Oxide (NCA), and combinations thereof; and wherein the positive current collector layer comprises aluminum.

8. A prismatic battery pack, comprising:

a first prismatic battery can;

a second prismatic battery can that is disposed adjacent to the first prismatic can;

an actively-cooled, bottom cold plate disposed underneath the first and second prismatic battery cans; and a thermal response barrier (TRB) layer disposed in-between the first and second prismatic battery cans;

wherein the TRB layer is configured to reduce heat conduction from the first prismatic battery can to the second prismatic battery can;

wherein the first prismatic battery can comprises a first plurality of stacked battery layers that are configured in an Inverted-U geometry inside of the first prismatic battery can; and wherein the second prismatic battery can comprises a second plurality of stacked battery layers that are configured in an Inverted-U geometry inside of the second prismatic battery can.

9. The prismatic battery pack of claim 8, wherein the second prismatic can is configured to have a thermal response time greater than about 1300 seconds to reach a peak temperature no more than about 155 C after a Thermal Runaway (TR) event occurs in the adjacent first prismatic battery can.

10. The prismatic battery of claim 8, wherein the first plurality of stacked battery layers comprises a negative current collector layer;

an anode electrode layer disposed adjacent to the negative current collector layer;

a separator layer disposed adjacent to the anode electrode layer;

a cathode electrode layer disposed adjacent to the separator layer opposite the anode electrode layer; and a positive current collector layer disposed adjacent to the cathode electrode layer.

11. An electric motor vehicle, comprising:

a vehicle body with a passenger compartment;

a plurality of road wheels attached to the vehicle body;

a traction motor attached to the vehicle body and operable to drive one or more of the plurality of road wheels to thereby propel the electric motor vehicle; and a traction battery pack attached to the vehicle body and electrically connected to the traction motor;

wherein the traction battery pack comprises a prismatic battery can;

wherein the prismatic battery can comprises:

an upper region;

a vertical Z-direction oriented along a height of the prismatic battery can;

a horizontal Y-direction oriented along a width of the prismatic battery can; and a plurality of stacked battery layers disposed inside of the prismatic battery can;

wherein the plurality of stacked battery layers has an in-plane direction and a transverse direction that is perpendicular to the in-plane direction;

wherein the plurality of stacked battery layers has an orthotropic thermal conductivity that has an in-plane thermal conductivity in the in-plane direction and a transverse thermal conductivity in the transverse direction;

wherein the in-plane thermal conductivity is greater than the transverse thermal conductivity;

wherein the plurality of stacked battery layers is configured inside of the prismatic battery can in an Inverted-U geometry;

wherein the in-plane thermal conductivity in the upper region of the prismatic battery can is higher in the horizontal Y-direction than the transverse thermal conductivity in the vertical Z-direction.

12. The electric motor vehicle of claim 11, wherein a ratio of the in-plane thermal conductivity divided by the transverse thermal conductivity of the plurality of stacked battery layers is greater than about 10.0.

13. The electric motor vehicle of claim 11, wherein an aspect ratio of a height of the prismatic battery can divided by a width of the prismatic battery can is greater than about 1.5.

14. The electric motor vehicle of claim 13, wherein the aspect ratio of the height divided by the width of the prismatic battery can is greater than about 3.0.

15. The electric motor vehicle of claim 11, wherein the prismatic battery can comprises a Lithium-ion battery.

16. The electric motor vehicle of claim 11, wherein the traction battery pack is disposed on top of an actively-cooled, bottom cold plate.

17. The electric motor vehicle of claim 11, wherein the upper region of the prismatic battery can has a height that ranges from 10% to 20% of a total height of the prismatic battery can.

18. The electric motor vehicle of claim 11, further comprising:

a second prismatic battery can that is disposed adjacent to the first prismatic battery can;

an actively-cooled, bottom cold plate disposed underneath both the first and second prismatic battery cans; and a thermal response barrier (TRB) layer disposed in-between the first and second prismatic battery cans that is configured to reduce heat conduction from the first prismatic battery can to the second prismatic battery can.

19. The electric motor vehicle of claim 11, wherein the second prismatic can is configured to have a thermal response time greater than about 1300 seconds to reach a peak temperature less than about 155 C, after a Thermal Runaway (TR) event occurs in the first prismatic battery can.

* * * * *